United States Patent [19]

Keck et al.

[11] 4,348,510

[45] Sep. 7, 1982

[54] LINEAR BLOCK COPOLYESTERS HAVING IMPROVED SLIP CHARACTERISTICS

[75] Inventors: Max H. Keck, Cuyahoga Falls; Paul R. Ginnings, Wadsworth, both of Ohio

[73] Assignee: The Goodyear Tire & Rubber Company, Akron, Ohio

[21] Appl. No.: 273,160

[22] Filed: Jun. 12, 1981

[51] Int. Cl.³ .............................................. C08G 77/04
[52] U.S. Cl. ...................................... 528/26; 528/27; 528/19; 528/17; 525/446; 525/474; 264/331.21
[58] Field of Search ....................... 528/26, 27, 17, 19; 525/446, 474; 264/331.21

[56] References Cited

U.S. PATENT DOCUMENTS

| | | | |
|---|---|---|---|
| 2,584,342 | 2/1952 | Goodwin, Jr. et al. | 525/446 |
| 3,701,815 | 10/1972 | Matzner et al. | 528/26 |
| 3,749,757 | 7/1973 | Marzocchi | 525/446 |
| 3,935,154 | 1/1976 | Cawley | 525/446 |

Primary Examiner—Melvyn I. Marquis
Attorney, Agent, or Firm—Oldham & Oldham

[57] ABSTRACT

This invention provides for novel linear thermoplastic block copolyesters derived from dicarboxylic acids or dialkyl esters thereof, alkylene glycols and dihydroxy terminated polydimethylsiloxane block copolymers. Films, tapes, sheeting and other extruded and molded articles prepared from said copolyesters exhibit improved clarity and when tested in accordance with ASTM test method D-1894 exhibit improved nonsticking properties.

8 Claims, No Drawings

LINEAR BLOCK COPOLYESTERS HAVING IMPROVED SLIP CHARACTERISTICS

TECHNICAL FIELD

This invention relates to compositions of matter comprising novel copolyesters. More particularly this invention relates to novel random linear thermoplastic block copolyesters useful in the preparation of such products as films, tapes, sheeting and other extruded and molded articles which articles exhibit and are characterized by their improved clarity, appearance and slip or nonblocking tendencies as evidenced by their reduced static and kinetic coefficients of friction.

BACKGROUND OF THE INVENTION

Various linear polyesters and copolyesters have been prepared for subsequent conversion into products such as films, tapes and sheeting. These polyesters and copolyesters are all polymeric compounds containing in their structural units, ester groups of the type derived from the interreaction of organic dicarboxylic acids or lower alkyl esters thereof and dihydric glycols. Film, tape and sheeting products prepared from these polyesters and copolyesters have very smooth surfaces, a highly desirable characteristic, but because of this smoothness have such an affinity for each other that when wound, stacked or otherwise brought into contact with each other will tend to stick together even when subjected to only the slightest of pressures. This tendency to stick or "block" gives rise not only to problems during the preparation of such products but also contributes to a diminution in their appearance qualities as a result of surface-to-surface abrasions during subsequent handling of such products.

In order to minimize or prevent the tendency of such products to stick or block together when brought into contact with each other, past practice has been to add to the polyester or copolyester what is commonly referred to in the industry as a slip or nonblocking agent. Generally slip or nonblocking agents consist of finely dispersed materials which reduce the coefficient of friction between adjacent surfaces of the products when brought into contact with each other. Examples of slip or nonblocking agents which have been employed in the past are such materials as silica, quartz, aluminum silicate, kaolin, clacium phosphates and the like. However, the use of such inorganic materials have two major drawbacks. The first of these is that, being inorganic, these materials are not soluble in the polyester or copolyester and thus impart an objectional haze in the final extruded or molded product. The second drawback is that such inorganic materials are difficult to disperse uniformly throughout the polyester or copolyester, frequently leading to the formation of agglomerates. These agglomerates not only cause difficulties during the processing of the polyester or copolyester into films, tapes, sheeting or other like products but also impart objectionable characteristics to the product such as impairment of clarity, interference with x-ray transmission or interference with audio and visual reproduction. Organic slip agents such as fatty acid amides have also been suggested, but these function by migration of the amide to the surface of the film or tape thereby limiting the uses to which polyesters containing these agents can be applied.

In contrast to past practice the present invention offers an attractive alternative to the use of inorganic and/or organic slip agents and the drawbacks associated therewith.

DISCLOSURE OF THE INVENTION

The present invention provides for random, linear thermoplastic block copolyesters, extruded and molded articles of which exhibit improved clarity and nonsticking characteristics when tested in accordance with ASTM test method D-1894, consisting essentially of the polymeric reaction product of a mixture of reactants comprising (A) at least one reactant selected from the group consisting of (1) aromatic dicarboxylic acids or the $C_1$ to $C_4$ dialkyl esters thereof and (2) aliphatic dicarboxylic acids or $C_1$ to $C_4$ dialkyl esters thereof wherein the reactant or reactants selected from group (A)(1) constitute from 100 to 50 mol percent of the total mols of said reactant (A) and the reactant or reactants from group (A)(2) constitute from 0 to 50 mol percent of the total mols of said reactant (A), (B) from about 100 to about 300 mol percent, based on the total mols of reactant (A) in said mixture of reactants, of at least one reactant selected from the group consisting of alkylene glycols containing from 2 to 10 carbon atoms and (C) from 0.75 to about 3.50 weight percent, based on the weight of said polymeric reaction product, of a dihydroxy terminated polydimethylsiloxane block copolymer of the general formula

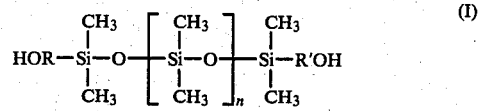

(I)

where n is an integer ranging from about 8 to about 15 and R and R' are divalent polymethylene oxide radicals corresponding to the formulae

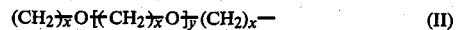

(II)

and

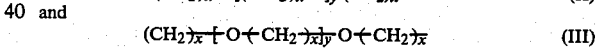

(III)

respectively and wherein X is an integer ranging from about 2 to about 8 and y is an integer ranging from about 8 to about 15 to provide said block copolymer with a molecular weight ranging from about 1600 to about 5500.

In a preferred embodiment the invention provides for random, linear thermoplastic block copolyesters consisting of the polymeric reaction product of the mixture of reactants (A), (B) and (C) defined hereinabove wherein reactant (A) is selected from said (A)(1) reactants consisting of aromatic dicarboxylic acids or the $C_1$ to $C_4$ dialkyl esters thereof, reactant (B) is selected from alkylene glycols containing from 2 to 6 carbon atoms and reactant (C) is a dihydroxy terminated polydimethylsiloxane block copolymer as defined in the general formula (I) set forth above wherein the integer n ranges from about 10 to about 13 and wherein the integers x and y of the divalent radical R and R' set forth in formulae (II) and (III) hereinabove range from about 2 to about 4 and from about 10 to about 13 respectively. In a more preferred embodiment the invention provides for random, linear thermoplastic block copolyesters consisting of the polymeric reaction product of the mixture of reactants (A), (B) and (C) wherein reactant (A) is selected from the group consisting of terephthalic acid or its dialkyl ester, dimethyl terephthalate, wherein reactant (B) ranges from about 100 to about 250 mol percent based on the total mols of reactant (A) and is ethylene glycol and wherein reactant (C) is a dihydroxy terminated polydimethyl siloxane block copolymer of the general formula (I) above wherein the integer n ranges from about 10 to about 13, the integer x of the divalent radicals R and R' as depicted in formulae (II) and (III) above is 2 and the integer y therein ranges from about 10 to about 13 to provide a dihydroxy terminated polydimethylsiloxane block copolymer having a molecular weight ranging from about 1900 to about 2400 and wherein said reactant (C) is present in said mixture of reactants (A), (B) and (C) in an amount ranging from about 1.0 to about 3.0 and preferably from about 1.0 to about 2.0 weight percent based on the weight of the polymeric reaction product.

As noted hereinabove the random linear block copolyesters of the present invention have been found to be especially useful in the production of extruded and molded articles such as films, tapes and sheeting products possessing superior clarity, appearance and at least equivalent if not better slip or nonblocking characteristics when tested in accordance with ASTM test method D-1894-78 compared to products prepared from polyester resins containing merely additive type slip agents.

Best Mode for Carrying Out the Invention

As demonstrated hereinbelow, the block copolyesters of the present invention are prepared by conventional processes and techniques employed in the production of polyesters. In accordance therewith the block copolyesters are prepared by first subjecting the mixture of reactants from which they are derived to either transesterification or esterification reaction conditions followed by subsequent polycondensation of either the transesterification or esterification reaction product. In general the transesterification reaction, involving reaction between a dialkyl ester of a dicarboxylic acid and glycol, will be conducted at elevated temperatures ranging from about 170° C. to about 205° C. and preferably from about 185° C. to about 200° C. under an inert gas atmosphere such as nitrogen. In addition, a catalyst will usually be employed to promote the transesterification reaction such as soluble lead and titanium compounds representatives of which include litharge, lead acetate, glycol titanates and the like as well as other well known transesterification catalysts such as compounds of zinc, magnesium, calcium and manganese. In many instances the soluble lead and titanium compounds may be preferred since these catalysts are also known to promote the formation of highly polymeric products in the subsequent polycondensation stage.

The esterification reaction involving reaction between a free dicarboxylic acid and a glycol with the evolution of water also is carried out at elevated temperatures and, in addition, elevated pressures employing inert gas atmospheres. Usually the reaction temperatures will range from about 220° C. to about 270° C. and pressures from about 30 to about 40 pounds per square inch (2.0-3.0 kilograms per square centimeter). The reaction can be carried out either in the presence or absence of catalysts. When catalysts are employed, those normally indicated in the art as being useful include compounds of metals such as zinc, lead, antimony, manganese, zirconium and the like. The reaction can also be carried out in the presence of low molecular weight polymeric solvent such as described in U.S. Pat. No. 4,020,049, the teachings of which are incorporated herein by reference.

The polycondensation reaction, the final preparation step in the production of the block copolyesters of the present invention, is also carried out employing well known techniques and conditions. Thus in the polycondensation step elevated temperatures, reduced pressures and inert atmospheres are utilized during the polymerization of the transesterification or esterification reaction product to the desired final product. Temperatures employed in this reaction step will generally range from about 260° C. to about 300° C. and preferably from about 270° C. to about 285° C. while pressures will range from about 1.0 to 0.1 millimeter of mercury pressure. Catalysts useful in promoting the polycondensation reaction include, in addition to the soluble lead and titanium catalysts noted above, various known compounds of antimony, niobium and germanium such as antimony trioxide, niobium pentoxide, germanium dioxide and the like. Normally these catalysts will be added to the transesterification or esterification reaction product when the formation of said product is fairly complete and before the polycondensation step is begun.

The following examples illustrate but do not limit the scope of the present invention. The dihydroxy terminated polydimethylsiloxane block copolymer used in preparing the block copolyesters in the examples below was DOW CORNING's Q4-3667 and is identified in the examples as "silicone diol". This commercially available ABA type block copolymer is characterized by DOW CORNING as a liquid silicone polycarbinol having a molecular weight of approximately 2400, a viscosity of 320 centipoises, a flash point of 140.5° C., a refractive index of 1.44 and a pour point of 18.3° C. All mol percentages are based on the total number of mols of the free dicarboxylic acids(s) and/or lower dialkyl ester(s) of dicarboxylic acids present in the reaction mixture. All weight percentages are based on the total weight of the polymeric reaction product, i.e. the block copolyesters constituting the present invention, resulting from reaction of the mixture of reactants (A), (B) and (C) defined herein. Intrinsic viscosities (I.V.) were determined employing a 60/40 phenol/tetrachloroethane mixed solvent system and measured in a No. 1 Ubbelohde viscosimeter at 30° C. using concentrations of 0.4 gram of sample per 100 cubic centimeters of mixed solvent. All film samples were conditioned and the coefficients of friction (both static and kinetic) thereof determined in accordance with ASTM test D-1894. Haze values for these films were tested in accordance with ASTM test D-1003.

EXAMPLE 1

To a 36.0 liter capacity stainless steel reactor fitted with a stirrer and distillation column were charged 9.16 kilograms (47.17 mols) of dimethyl terephthalate, 6.44 kilograms (103.7 mols, 219.8 percent) of ethylene glycol and 12.8 milliliters of a solution containing 6.0 percent by weight of manganese octanate in mineral spirits as the transesterification catalyst. This mixture was heated from 173° C. to 214° C. over a period of four hours, with constant stirring, during which time a total of 3840 milliliters of methanol were distilled from the reaction mixture. At this point the equivalent of 0.04 part by weight of a phosphorous stabilizer per 1000 parts by weight of the calculated yield of the block copolyester was added to and stirred into the reaction mixture which was then transferred to a 40.0 liter capacity stainless steel polycondensation reaction vessel. To the mixture in the polycondensation reaction vessel was then added 2.28 grams of antimony trioxide as the polycondensation catalyst and 92.0 grams (1.0 weight percent) of silicone diol. The temperature of the reaction mixture was raised from 220° C. to 260° C. and the pressure in the vessel reduced to 1.0 millimeter of mercury pressure over a period of one hour. During the second hour of polycondensation the temperature was increased from 260° C. to 280° C. and the pressure was further reduced to 0.3 millimeter of mercury pressure. At the end of this time the block copolyester product was discharged from the reactor and was clear and of excellent color. Its I.V. was determined to be 0.676.

EXAMPLE 2

A second block copolyester was prepared employing the same identical equipment, techniques and conditions as employed in Example 1 with the exception that 181.41 grams (2.0 weight percent) of silicone diol was added to the transesterification reaction product prior to the polycondensation thereof. Again the product was clear and of good color and had an I.V. of 0.602.

EXAMPLE 3

Employing the general process as described in U.S. Pat. No. 4,020,049 there was prepared a random, linear thermoplastic block copolyester of the present invention as follows.

To a 9.5 gallon (36.0 liter) capacity stainless steel reactor equipped with a stirrer and distillation column there were added 20.81 pounds (9.44 kilograms) of terephthalic acid (TPA) and 9.32 pounds (4.23 kilograms) of ethylene glycol (EG). The reactor was pressurized to 35 pounds per square inch (2.5 kilograms/square centimeter) pressure and the mixture therein heated, with continuous stirring, to about 268° C. for 4.5 hours. At the end of this time 1140 grams of by-product water had been distilled from the reactor. Heating and stirring of the reaction mixture (low molecular weight polymer) were continued for an additional one hour beyond this point.

To the above reaction product which functions as a solvent for the following esterification reaction were added 17.3 pounds (7.85 kilograms) of TPA and 7.74 pounds (3.5 kilograms; 120 mol percent) of EG. This mixture was reacted for two hours at a temperature of from 255° C. to 268° C. under a pressure of 35 pounds per square inch (2.5 kilograms/square centimeter) until 1260 grams of by-product water had been collected. At this point a portion of the reaction mixture, equivalent to the weight of the product of the reaction of 17.3 pounds (7.85 kilograms) of TPA and 7.74 pounds (3.5 kilograms) of EG or approximately 20.1 pounds (1.1 kilograms) was transferred to a 10.4 gallon (39.4 liters) capacity stainless steel polymerization vessel equipped with a stirrer, distillation column and vacuum line. To the reaction mixture in this polymerization vessel were then added 204 grams (2.25 weight percent) of the silicone diol and 168.6 grams of an ethylene glycol solution containing 11.0 grams of antimony trioxide ($Sb_2O_3$) per 1000 grams of ethylene glycol as catalyst. Over the next 65 minutes the temperature of the reaction mixture was increased from 258° C. to 272° C. and the pressure in the polymerization vessel decreased from atmospheric pressure to 1.0 millimeter of mercury pressure. The reaction mixture was then heated an additional 30 minutes at 269° C. to 277° C. and a pressure of 0.20 millimeter of mercury. At the end of this time the copolyester product was discharged from the reactor and determined to have an I.V. of 0.507.

EXAMPLE 4

Into a 5.8 gallon (22.0 liters) capacity stainless steel reactor equipped with a stirrer and distillation column were added 12.4 pounds (5.6 kilograms) of TPA and 5.6 pounds (2.5 kilograms) of EG. The mixture was heated, with continuous stirring, for five hours at about 265° C. and under 35 pounds per square inch (2.5 kilograms/square centimeter) pressure. The reaction was considered essentially complete when 1065 grams of by-product water had been collected.

To the above reaction product, used in this stage as a solvent, were added 10.4 pounds (4.7 kilograms) of TPA and 4.7 pounds (2.1 kilograms; 120 mol percent) of EG. The mixture was heated for about 250 minutes, with continuous stirring, from a temperature ranging from about 238° C. to 273° C. and under 35 pounds per square inch (2.5 kilograms/square centimeter) pressure. A total of 920 grams of by-product water were distilled out of the reactor during the reaction cycle. At this point a portion of the reaction mixture, equivalent to the weight of the product of 10.4 pounds (4.7 kilograms) of TPA and 4.7 pounds (2.1 kilograms) or approximately 12.1 pounds (5.5 kilograms) was transferred into a 7.3 gallon (27.6 liters) capacity stainless steel polymerization vessel equipped with a stirrer, distillation column and vacuum line. To the reaction mixture were then added 163 grams (3.0 weight percent) of the silicone diol and 104 grams of an ethylene glycol solution containing 11 grams of $Sb_2O_3$ per 1000 grams of ethylene glycol as catalyst. Over an 80 minute period the temperature of the reaction mixture was held at 264° C. to 268° C. while the pressure in the reaction vessel was reduced from atmospheric pressure to 2.1 millimeters of mercury pressure. The reaction mixture was then heated at 264° C. to 273° C. at a pressure of 1.3 millimeters of mercury pressure for an additional 115 minutes. The copolyester product was then discharged from the reaction vessel and determined to have an I.V. of 0.567.

EXAMPLE 5

Example 4 was repeated in all respects with the following exceptions. The amount of TPA and EG added to low molecular weight reaction product prepared in the first step was 8.7 pounds (3.9 kilograms) and 3.9 pounds (1.77 kilograms; 121 mol percent) respectively, the amount of $Sb_2/O_3$/ethylene glycol catalyst solution employed was 87.0 grams and the weight of silicone diol added was 159 grams (3.5 weight percent). The copolyester obtained was determined to have an I.V. of 0.574.

EXAMPLE 6

A comparative example was carried using the same identical equipment, procedures, operating conditions, materials and quantities as in Example 3 with the exception that the amount of silicone diol employed was increased to 363.0 grams (4.0 weight percent). The resultant copolyester was determined to have an I.V. of 0.518.

Samples of the block copolyesters prepared in Examples 1 through 6 were flat die extrusion molded into nonoriented films of nominal 10 to 12 mil thickness. Various properties of the extruded films are presented in Table I below.

TABLE I

| Example No. | Silicone Diol Weight % | Resin I.V. | Haze % | Coefficient of Friction | |
|---|---|---|---|---|---|
| | | | | Static | Kinetic |
| 1 | 1.00 | 0.676 | 0.7 | 0.33 | 0.27 |
| 2 | 2.00 | 0.60 | 0.6 | 0.33 | 0.27 |
| 3 | 2.25 | 0.507 | 1.8 | 0.39 | 0.32 |
| 4 | 3.00 | 0.567 | 1.8 | 0.37 | 0.38 |
| 5 | 3.50 | 0.574 | 2.8 | 0.40 | 0.34 |
| 6[1] | 4.00 | 0.518 | 21.0 | 0.30 | 0.30 |
| A[2] | 0 | — | 3.4 | 0.37 | 0.37 |
| B[3] | 0 | — | 0.7 | 2.01 | 0.95 |

[1] Comparative film example from a block copolyester containing too great a content of silicone diol resulting in hazy films.
[2] Comparative film example flat die extruded from 0.72 I.V. polyethylene terephthalate resin containing 0.75 part by weight of finely divided $SiO_2$ as slip agent per 1000 parts by weight of resin.
[3] Comparative film example, flat die extruded from 0.72 I.V. polyethylene terephthalate resin containing no slip agent In addition to nonoriented films, biaxially oriented films can also be prepared from the block copolyesters of the present invention which films exhibit improvements in coefficient of friction and haze of approximately the same magnitude as observed in the nonoriented films.

EXAMPLE 7

A mixture of 48 grams dimethyl terephthalate, 38.0 grams (250 mol percent) of 1,6-hexanediol and 0.288 gram of a solution of tetrabutyl titanate (0.006 weight percent titanium) in ethylene glycol was placed in a glass reaction tube equipped with a stirrer and a side arm fitted with a condenser. The mixture was heated for four hours at 200° C. during which time approximately 16.0 milliliters of methanol by-product were distilled from the reaction tube and 1.44 grams of (3.0 weight percent) silicone diol were then added to the reaction mixture which was then heated for another 90 minutes at 200° C. During the next 80 minutes of reaction time the temperature of the mixture was gradually raised to 265° C. and the pressure reduced to 0.3 millimeter of mercury pressure. The polycondensation reaction was then continued for an additional 120 minutes at the end of which time the polymeric copolyester product was discharged. The intrinsic viscosity of the product was determined to be 0.618.

EXAMPLE 8

To reaction apparatus identical to that employed in Example 7 was added 26.2 grams (45 mol percent) of dimethyl terephthalate, 42.8 grams (230 mol percent) of ethylene glycol, 1.84 grams (3.0 weight percent) of the silicone diol, 0.0078 gram of manganese acetate and 0.0191 gram of antimony trioxide. This mixture was heated for three hours at 185° C., during which time 8.0 milliliters of by-product methanol was distilled off. To the reaction mixture was then added 35.19 grams (51 mol percent) of dodecanedioic acid and 2.66 grams (4 mol percent) of t-butyl isophthalic acid. Heating of this mixture was continued for three hours at 200° C. and over an additional two hour period the temperature of the mixture was increased to 260° C. At the end of this period the pressure in the reaction tube was reduced to 0.3 millimeter of mercury pressure over a span of 20 minutes. The pressure was further reduced to 0.1 millimeter of mercury pressure over a period of four hours during which time the temperature of the reaction mixture was maintained at a temperature of 265° C. The final polymeric block copolyester product had an I.V. of 0.801 and exhibited considerably reduced blocking tendencies compared to an analogous polyester containing no silicone diol.

The preparation of various random, linear thermoplastic block copolyesters constituting the present invention and characterization of film produced therefrom have been illustrated in the examples above and particularly with respect to block copolyesters prepared from reaction mixtures comprised of terephthalic acid or its dimethyl ester and either ethylene glycol (Examples 1-5) or 1,6-hexanediol (Example 7) and the silicone diol and mixtures comprised of dimethyl terephthalate dodecanedioic acid and t-butyl isophthalic acid, ethylene glycol and the silicone diol (Example 8). Representative examples of other acids which can be employed to prepare the block copolyesters of this invention include the aromatic dicarboxylic acids, isophthalic acid, 1,5-naphthalene dicarboxylic acid, 2,6-naphthalene dicarboxylic acid, 4,4'-diphenyl dicarboxylic acid and the like.a Representative examples of aliphatic dicarboxylic acids or the $C_1$ to $C_4$ dialkyl esters thereof which can be used in combination with the aromatic dicarboxylic acids or their dialkyl ester, include in addition to dodecanedioic acid, azelaic, pimelic, sebacic acids. Representative examples of other glycols which can be employed to prepare the block copolyesters of this invention include diethylene glycol, propylene glycol, 1,8-octanediol, decamethylene gklycol and the like, branched chain glycols such as neopentyl glycol, 2-methyl-2-ethyl propanediol-1,3 and 2,2-diethyl propanediol-1,3 and cycloalkane diols such as cyclohexane dimethanol. Of the block copolyesters described herein those prepared from terephthalic acid or its dimethyl ester, ethylene glycol and DOW CORNING's Q4-3667 are most preferred.

As noted hereinabove molded and extruded articles such as films, tapes, sheeting, etc. prepared from the block copolyester described herein exhibit improved clarity and when conditioned and tested in accordance with ASTM test D-1894 exhibit improved nonsticking properties as evidenced by their reduced static and kinetic coefficients of friction. Specifically, molded and extruded articles prepared from block copolyesters described herein will generally possess haze values of about 3.0 percent and less but more particularly the haze value will range from about 2.8 percent down to about 0.7 percent. The static and kinetic coefficients of friction for molded and extruded articles prepared from the block copolyesters herein described will generally be about 0.45 and less, but more particularly said values will be about 0.40 and less.

While certain representative embodiments and details have been shown for the purpose of illustrating the invention it will be apparent to those skilled in this art that various changes and modifications can be made thereto without departing from the spirit and scope of the invention as defined in the appended claims hereinbelow.

We claim:

1. A random, linear, thermoplastic block copolyester, extruded and molded articles of which exhibit improved clarity and nonsticking characteristics when tested in accordance with ASTM test D-1894, consisting essentially of the polymeric reaction product of a mixture of reactants comprising
   (A) at least one reactant selected from the groups of reactants consisting of (1) aromatic dicarboxylic acids or the $C_1$ to $C_4$ dialkyl esters thereof and
(2) aliphatic dicarboxylic acids or the $C_1$ to $C_4$ dialkyl esters thereof wherein the reactant selected from group (1) constitutes from 100 to 50 mol percent of the total mols of reactant (A) and the reactant selected from group (2) constitutes from 0 to 50 mol percent of the total mols of reactant (A);

(B) from about 100 to about 300 mol percent, based on the total mols of reactant (A) of at least one reactant selected from the group consisting of alkylene glycols containing from 2 to 10 carbon atoms; and (C) from about 0.75 to about 3.50 weight percent, based on the weight of the polymeric reaction product, of a dihydroxy terminated polydimethylsiloxane block copolymer of the general formula

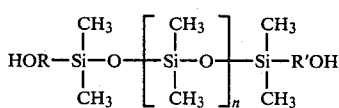 (I)

where n is an integer ranging from about 8 to about 15 and R and R' are divalent polymethylene oxide radicals corresponding to the general formulae

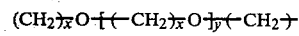 (II)

and

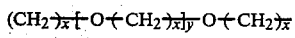 (III)

respectively wherein x is an integer ranging from about 2 to about 8 and y is an integer ranging from about 8 to about 15 and wherein said dihydroxy terminated polymethylsiloxane block copolymer has a molecular weight ranging from about 1600 to about 5500.

2. A copolyester of claim 1 consisting essentially of the polymeric reaction product of said mixture of reactants (A), (B) and (C) wherein reactant (A) is selected from the group (1) reactants consisting of aromatic dicarboxylic acids or the $C_1$ to $C_4$ dialkyl esters thereof, reactant (B) is selected from alkylene glycols containing from 2 to 6 carbon atoms and reactant (C) is a dihydroxy terminated polydimethylsiloxane block copolymer corresponding to the general formula

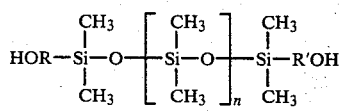 (I)

where n is an integer ranging from about 10 to about 13 and the divalent polymethylene oxide radicals correspond to the general formulae

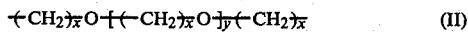 (II)

and

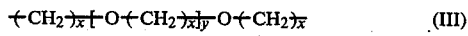 (III)

wherein the integer x ranges from about 2 to about 4 and the integer y ranges from about 10 to about 13 said reactant (C) comprising from about 1.0 to about 3.0 weight percent, based on the weight of the polymeric reaction product, of said mixture of reactants.

3. A copolyester of claim 2 consisting essentially of the polymeric reaction product of the mixture of reactants (A), (B) and (C) wherein reactant (A) is selected from the group consisting of terephthalic acid and dimethyl terephthalate.

4. A copolyester of claim 3 consisting essentially of the polymeric reaction product of the mixture of reactants (A), (B) and (C) wherein reactant (B) ranges from about 100 to about 250 mol percent, based on the total mols of reactant (A), and wherein reactant (B) is ethylene glycol.

5. A copolyester of claim 4 consisting essentially of the polymeric reaction product of the mixture of reactants (A), (B) and (C) wherein reactant (C) is the dihydroxy terminated polydimethylsiloxane block copolymer corresponding to the general formula (I) in which the integer n ranges from about 10 to about 13, the integer x of the divalent radicals R and R' therein corresponding to the formulae (II) and (III) is 2 and the integer y of the divalent radicals R and R' therein corresponding to the formulae (II) and (III) ranges from about 10 to about 13 and wherein the molecular weight of reactant (C) ranges from about 1900 to about 2400.

6. A copolyester of claim 5 consisting essentially of the polymeric reaction product of the mixture of reactants (A), (B) and (C) wherein reactant (C) comprises from about 1.0 to about 2.0 weight percent based on the weight of said polymeric reaction product.

7. A copolyester of claim 5 consisting essentially of the polymeric reaction product of the mixture of reactants (A), (B) and (C) wherein reactant (C) has a molecular weight of about 2400, a viscosity of about 320 centipoises, a flash point of about 140.5° C., a refractive index of 1.44 and a pour point of about 183° C.

8. Molded and extruded articles comprised of the random, linear, thermoplastic block copolyester of claim 7, said articles being characterized by static and kinetic coefficients of friction of less than about 0.45 respectively as measured in accordance with ASTM test D-1894 and haze values of less than about 3.0 percent as measured in accordance with ASTM test D-1003.

* * * * *